Sept. 22, 1959 W. LALLIER 2,905,499
HAND HOOK
Filed Nov. 9, 1956
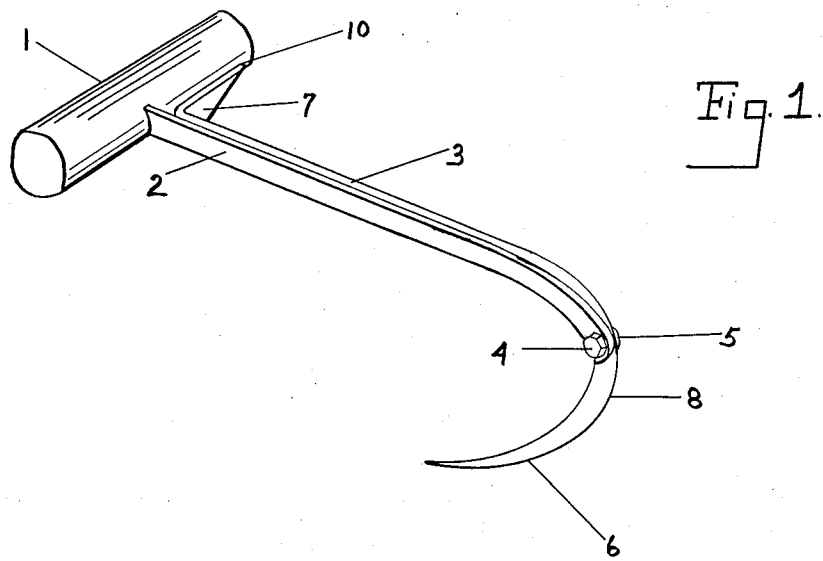
Fig. 1.
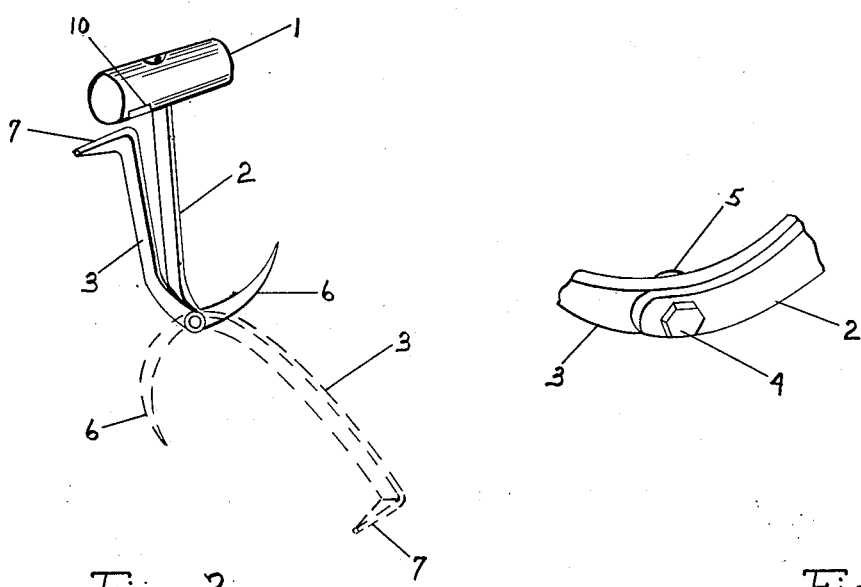
Fig. 2.
Fig. 3.
INVENTOR.
Wendel Lallier
BY John P. Murphy
Attorney

United States Patent Office 2,905,499
Patented Sept. 22, 1959

2,905,499

HAND HOOK

Wendel Lallier, Cassville, N.Y.

Application November 9, 1956, Serial No. 621,299

1 Claim. (Cl. 294—26)

The present invention relates to an improved hand hook for use in handling commodities, such as bales of hay, cotton and the like, and also for handling commodities in sacks and bags.

An important object of the present invention is to provide a hand hook with means whereby when the hook is released, it will automatically disengage itself from the bale, sack, or bag.

This invention has for another of its objects to provide a hand hook of this character which is so designed and constructed so as to afford maximum protection to the hand of the user, against chaffing or injury during the handling of the bales and to permit the ready release of the hook from the bale when so desired.

Another object of the invention is to provide a trip bale hook which is light yet strong, durable and inexpensive in construction, and whose releasing mechanism is simple and adapted to be conveniently governed by the user.

Still another important feature of the present invention is the fact that the user does not have to shift the position of his hand when releasing the bale. By the mere lifting of a finger, the bale is released from the hook.

With these and other objects in view, the invention consists in features of construction, combination and arrangement of parts as will hereinafter more fully be described, illustrated in the accompanying drawing, which discloses a preferred embodiment of the invention pointed out in the claim hereunto appended.

In the accompanying drawing:

Figure 1 illustrates a perspective view of the hand hook constructed in accordance with my invention.

Figure 2 illustrates, in a perspective view, the hand hook with a dotted line showing the position of the hook after being released and disengaged from the bale.

Figure 3 is an enlarged view, in part, showing one means of attachment of the hook to the stem.

With reference now being made to the drawing, and in particular to Figure 1, it is seen that the hook embodying this invention has a handle 1 which is substantially cylindrical in form and is provided with a stem or rod 2 extending therefrom. It is further seen that the handle 1 is provided with a cut 10, the use of which will be more fully described. The disengageable hook portion comprises a stem 3, a release projection 7 which fits into the cut 10 of the handle 1, and a bill 6 having a bend at the area designated in the drawing by the reference character 8. It should be noted that the stem 3 runs parallel to the stem or rod 2 and may be located on either side of the rod 2.

The cut 10 may best be described as a hollowed out area forming substantially a groove having a planar bottom. Into the groove or cut 10, the release projection 7 is adapted to lie or be otherwise disposed in such a manner that the release projection 7 will be substantially contained within the cut 10. Thus, the release projection does not extend beyond the dimension of the handle 1, and therefore lies flush with the surface of the handle 1. The fingers of the user of the hook are thus protected against chaffing and pinching between the release projection and the handle, and with the release projection thus contained within the dimension of the handle 1; the operator or user of the hook may use the hook for long periods of time without undue fatigue.

As seen in the drawing, the release projection 7 is formed from the stem 3, fits into the cut 10 and is relatively tangent to the handle 1. This feature provides a more comfortable grasping means for the user. The stem 3 is pivotally connected to the rod 2, just above the bend 8, here shown by means of a hex head rivet 4 and washer 5. It should be understood that any suitable attachment means may be used for this purpose.

The construction of the present invention is so designed so as to allow the user to grip the handle 1 in a conventional manner while retaining the release projection 7 in the cut 10 and while the hook 6 is engaged in a bale. In this way, a firm, yet comfortable grip is had on the handle 1 as well as the release projection 7 without any undue restrictions, eliminating shifting, chaffing and other such discomforts. It should also be noted that the construction of the release projection 7, the stem 3 and the bill 6 is so balanced, that when the releasable hook portion is disengaged from the bale, the stem 3 automatically swings forward, away from the user, thus preventing any injury during its use. It is obvious to one skilled in the art, that the bill 6 is short enough to fail to reach the hand portion, when in a released position.

In the operation of this improved hand hook, the user initially grasps the handle 1 along with the release projection 7 in one hand and wields the hook in the customary manner to embed its bill 6 into the bale or other package. In order to disengage the bill 6 from the bale, the user, while retaining his grip on the handle 1 and drawing upon the same, releases the release projection 7, whereupon the weight of the load upon the bill 6 causes the release hook portion to turn to dispose the bale in a position away from the user, whereby the release projection 7 and the stem 3 fall downward and hence the bill 6 becomes automatically disengaged from the bale. The position of the hook while becoming disengaged in this manner, is indicated in dotted lines in Figure 2. It is seen that a minimum of movement and effort is required for the user of the hook to release the release projection 7 from the cut 10 so as to disengage the hook from the load. Inasmuch as the release projection 7 lies substantially flush with the surface of the handle 1, the hook may be used for long periods of time without causing undue fatigue to the user, and the user is further protected against chaffing and injury such as pinching of the fingers.

It is not desired that the construction of the invention be limited to either of the forms shown here, nor details, as it is evident that other modifications and changes may be made within the scope of the appended claim.

I claim:

A hook comprising, a rod, a handle on one end of said rod, a pivot on the opposite end of said rod, a stem pivotally mounted intermediate its ends on said pivot, said stem having a hook on one end thereof, a projection on the opposite end of said stem and disposed parallel to said handle, said handle having a cut therein on the side facing the pivot; said projection, when in the operative position, being adapted to project into the cut in said handle, whereby said projection is graspable and releasable by a hand grasping the handle.

References Cited in the file of this patent

UNITED STATES PATENTS 931,339    Penington et al. _____ Aug. 17, 1909